United States Patent
Fedeli (10) Patent No.: US 9,394,789 B2
(45) Date of Patent: Jul. 19, 2016

(54) PISTON VIBRATOR

(76) Inventor: Giancarlo Fedeli, Foligno (IT)

( * ) Notice: Subject to any disclaimer, the term of this patent is extended or adjusted under 35 U.S.C. 154(b) by 503 days.

(21) Appl. No.: 13/877,307

(22) PCT Filed: Oct. 3, 2011

(86) PCT No.: PCT/IB2011/054335
§ 371 (c)(1),
(2), (4) Date: Jun. 26, 2013

(87) PCT Pub. No.: WO2012/042512
PCT Pub. Date: Apr. 5, 2012

(65) Prior Publication Data
US 2013/0269512 A1    Oct. 17, 2013

(30) Foreign Application Priority Data
Oct. 1, 2010   (IT) ............................... TO2010A0801

(51) Int. Cl.
*F01B 1/01*    (2006.01)
*B06B 1/18*    (2006.01)
*G01V 1/133*   (2006.01)

(52) U.S. Cl.
CPC ... *F01B 1/01* (2013.01); *B06B 1/18* (2013.01); *G01V 1/133* (2013.01)

(58) Field of Classification Search
CPC ............ B25D 9/145; B25D 9/20; B25D 9/12; G01V 1/133; G01V 1/145; B06B 1/18; F01B 1/01; F03C 1/0076; F03C 1/12
USPC ............... 91/235, 321, 224, 166, 216 B, 415, 91/417 R, 342; 417/404
See application file for complete search history.

(56) References Cited

U.S. PATENT DOCUMENTS

| 638,490 | A | * | 12/1899 | Albree | .................... | F01B 17/04 91/155 |
| 998,477 | A | * | 7/1911 | Duval et al. | ............. | F01L 29/04 91/20 |
| 1,050,951 | A | * | 1/1913 | Kessel | ...................... | E02D 7/10 91/216 B |

(Continued)

FOREIGN PATENT DOCUMENTS

| FR | 2 243 630 A6 | 4/1975 |
| GB | 1 084 647 A | 9/1967 |

OTHER PUBLICATIONS

International Search Report and Written Opinion for PCT/IB2011/054335, mailed Jan. 19, 2012, 8 pages.

*Primary Examiner* — Nathaniel Wiehe
*Assistant Examiner* — Richard Drake
(74) *Attorney, Agent, or Firm* — Klarquist Sparkman, LLP (57) ABSTRACT

A vibrator has a hollow body with two end walls, a first piston slidably housed within the body, a first chamber defined therein and communicating with an inlet and bounded by a first active surface of the first piston, and a second chamber bounded by a second active surface of the piston, larger than and opposite the first active surface. The first piston slidingly houses a switch unit having at least one second piston and controlled by a fluid switch circuit having an inlet portion formed in the first piston and communicating with the first chamber. An outlet portion is formed in the first piston and communicates with the outlet. A switch portion, which is defined by the switch unit, communicates with the second chamber, and connects the second chamber to the inlet portion and to the outlet portion alternately as a function of the switch unit's axial position.

12 Claims, 7 Drawing Sheets

(56) References Cited

U.S. PATENT DOCUMENTS

| | | | |
|---|---|---|---|
| 3,010,439 A * | 11/1961 | Mee | B06B 1/183 |
| | | | 91/226 |
| 3,396,634 A * | 8/1968 | Buterworth | F01B 17/00 |
| | | | 173/DIG. 4 |
| 4,031,812 A * | 6/1977 | Koshelev | 91/224 |
| 4,285,415 A | 8/1981 | Paitson | |
| 4,286,929 A * | 9/1981 | Heath et al. | 417/404 |
| 4,300,654 A * | 11/1981 | Raymond et al. | 181/120 |
| 4,395,649 A * | 7/1983 | Thome et al. | 310/15 |
| 4,858,702 A * | 8/1989 | Piras | B25D 9/18 |
| | | | 173/208 |
| 5,598,635 A * | 2/1997 | Saito | 30/362 |
| 6,210,131 B1 * | 4/2001 | Whitehead | 417/397 |

\* cited by examiner

PISTON VIBRATOR

CROSS REFERENCE TO RELATED APPLICATIONS

This is the U.S. National Stage of International Application No. PCT/IB2011/054335, filed Oct. 3, 2011, which was published in English under PCT Article 21(2), which in turn claims the benefit of Italy Application No. TO2010A000801, filed Oct. 1, 2010. The Italian application is incorporated herein in its entirety.

TECHNICAL FIELD

The present invention relates to a piston vibrator, particularly suitable for use in industry, for removing scale and other materials from tanks and pipes; for crushing, deforming, and cutting; and, in agriculture, for shaking olives and other fruit off trees.

More specifically, the present invention relates to a vibrator of the type comprising a hollow body, in turn comprising a lateral wall with a longitudinal axis, a first and second end wall crosswise to the longitudinal axis, and a pressurized-fluid inlet and outlet; a piston, which slides in fluidtight manner inside the hollow body to perform a succession of work cycles, each comprising a forward stroke and a return stroke along the longitudinal axis, and defines, inside the hollow body, a first chamber communicating with the inlet and having a first active surface, and a second chamber having a second active surface larger than the first; and a circuit extending at least partly through the piston to connect the second chamber to the first chamber and to the outlet alternately.

BACKGROUND ART

As explained in more detail below, known vibrators of this sort can only be made cheaply with relatively small-diameter pistons, because of the absence of seals between the piston and the lateral wall of the hollow body, and, above all, can only perform relatively short strokes with respect to the distance between the end walls. Short strokes and small piston diameters combine to reduce the capacity of known vibrators of the above type to generate high-energy vibration each time the piston strikes the end walls.

DISCLOSURE OF INVENTION

It is an object of the present invention to provide an improved vibrator of the above type, which is simple in design, cheap to produce, and capable of generating the highest-energy vibration possible at each strike.

According to the present invention, there is provided a vibrator as claimed in claim 1 and preferably in each claim depending directly or not on claim 1.

BRIEF DESCRIPTION OF THE DRAWINGS

A number of non-limiting embodiments of the invention will be described by way of example with reference to the accompanying drawings, in which.

BEST MODE FOR CARRYING OUT THE INVENTION

Figure 1:
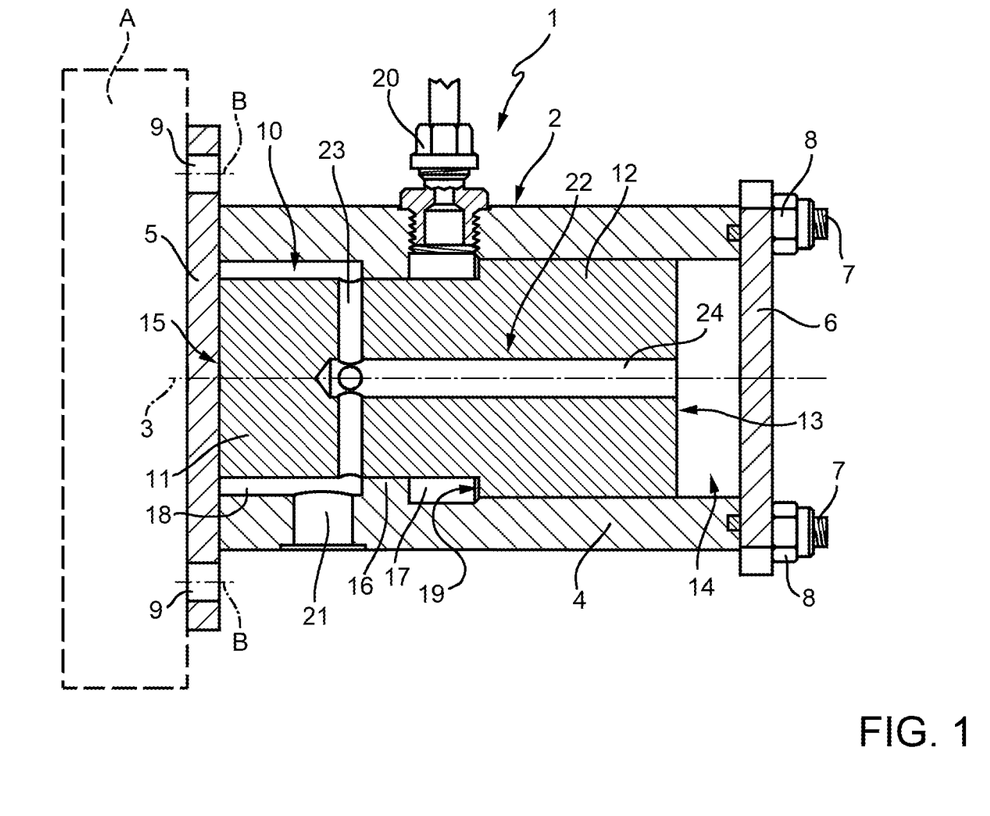
FIG. 1 shows an axial longitudinal section of a known vibrator of the type described above.

Number 1 in FIG. 1 indicates as a whole a known vibrator comprising a hollow body 2 having an axis 3 and defined by a tubular lateral wall 4, which is closed at both ends by two end walls 5, 6 crosswise to axis 3 and fitted in fluidtight manner to the respective ends of lateral wall 4 by threaded ties 7 fitted with respective nuts 8 on the outside of end wall 6. End wall 5 has a peripheral portion projecting outwards of lateral wall 4 and having through holes 9, in which to insert fasteners B, e.g. screws (not shown), for securing vibrator 1 rigidly to a body A for vibration.

Vibrator 1 also comprises a piston 10 mounted inside hollow body 2 to slide along axis 3, and which mates in fluidtight manner with an inner surface of lateral wall 4. More specifically, the mating surfaces of piston 10 and lateral wall 4 are precision machined to strict mating tolerances, to permit fluidtight sealing without using seals.

Piston 10 comprises two portions 11, 12 of different diameters. The larger-diameter portion 12 mates in sliding and fluidtight manner with the inner surface of lateral wall 4, and has an end surface 13, which defines an active surface of piston 10, faces end wall 6, and defines, with end wall 6 and lateral wall 4, a pressurizing chamber 14, which varies in volume according to the axial position of piston 10 inside hollow body 2. Portion 11, on the other hand, is bounded by an end surface 15 facing end wall 5, and mates in sliding and fluidtight manner with the inner surface of an annular rib 16, which projects inwards of lateral wall 4, and divides the space between the inner surface of lateral wall 4 and the outer surface of portion 11 into two annular chambers 17, 18, which vary in volume, inversely with respect to the volume of chamber 14, according to the axial position of piston 10 inside hollow body 2. More specifically, annular chamber 17 is a feed chamber comprising an active surface 19, which is much smaller than surface 13, is defined by an annular shoulder connecting portions 11 and 12 of piston 10, extends about axis 3, and is located in an intermediate position between chamber 14 and annular chamber 18.

Regardless of the axial position of piston 10 inside hollow body 2, annular chamber 17 communicates with a fitting 20 fitted in fluidtight manner through lateral wall 4 to feed pressurized fluid into hollow body 2. Annular chamber 18, on the other hand, is an outlet chamber adjacent to end wall 5, and, regardless of the axial position of piston 10 inside hollow body 2, communicates with an outlet hole 21 through lateral wall 4.

A fluid switch circuit 22 is formed through piston 10, and comprises an inlet-outlet portion 23 defined by a diametrical hole crosswise to axis 3, and which either communicates with annular chamber 17 or annular chamber 18, or is closed by annular rib 16, depending on the position of piston 10 inside hollow body 2; and a connecting portion 24 defined by an axial hole communicating at one end with an intermediate point along portion 23, and at the other end with chamber 14.

Operation of known vibrator 1 will now be described as of the FIG. 1 position, in which end surface 15 of portion 11 of piston 10 is positioned contacting the inner surface of end wall 5.

In this position, chamber 14 is connected to outlet hole 21 by fluid circuit 22 and annular chamber 18. When pressurized fluid is fed to annular chamber 17, active surface 19 is subjected to an axial force F1 in the direction of end wall 6, and piston 10 moves rapidly towards end wall 6, thus cutting off communication between fluid circuit 22 and annular chamber 18 at rib 16, disconnecting chamber 14 from outlet hole 21, and increasing the pressure inside chamber 14. As piston 10 moves closer to end wall 6, chamber 14 is connected to annular chamber 17 via fluid circuit 22, and the pressure in chamber 14 increases sharply to equal the pressure in annular chamber 17. As a result of the pressure in chamber 14 at this point, piston 10 is subjected to an axial force F2 opposite force F1, and whose ratio to force F1 equals the ratio between surfaces 13 and 19. The resulting force therefore causes piston 10 to reverse rapidly away from end wall 6, violently impact end wall 5, and connect chamber 14 once more to outlet hole 21 to commence another cycle.

Piston 10 therefore inverts its stroke before reaching end wall 6, with the result that there is no impact on end wall 6, and the kinetic energy of piston 10, on impacting end wall 5, is less than it would be if the stroke of piston 10 were not cut short.

Another drawback lies in the fluidtight sealing, with no seals, between piston 10 and lateral wall 4 of hollow body 2, which can only be achieved cheaply for relatively small-diameter pistons 10.

Figure 2A:
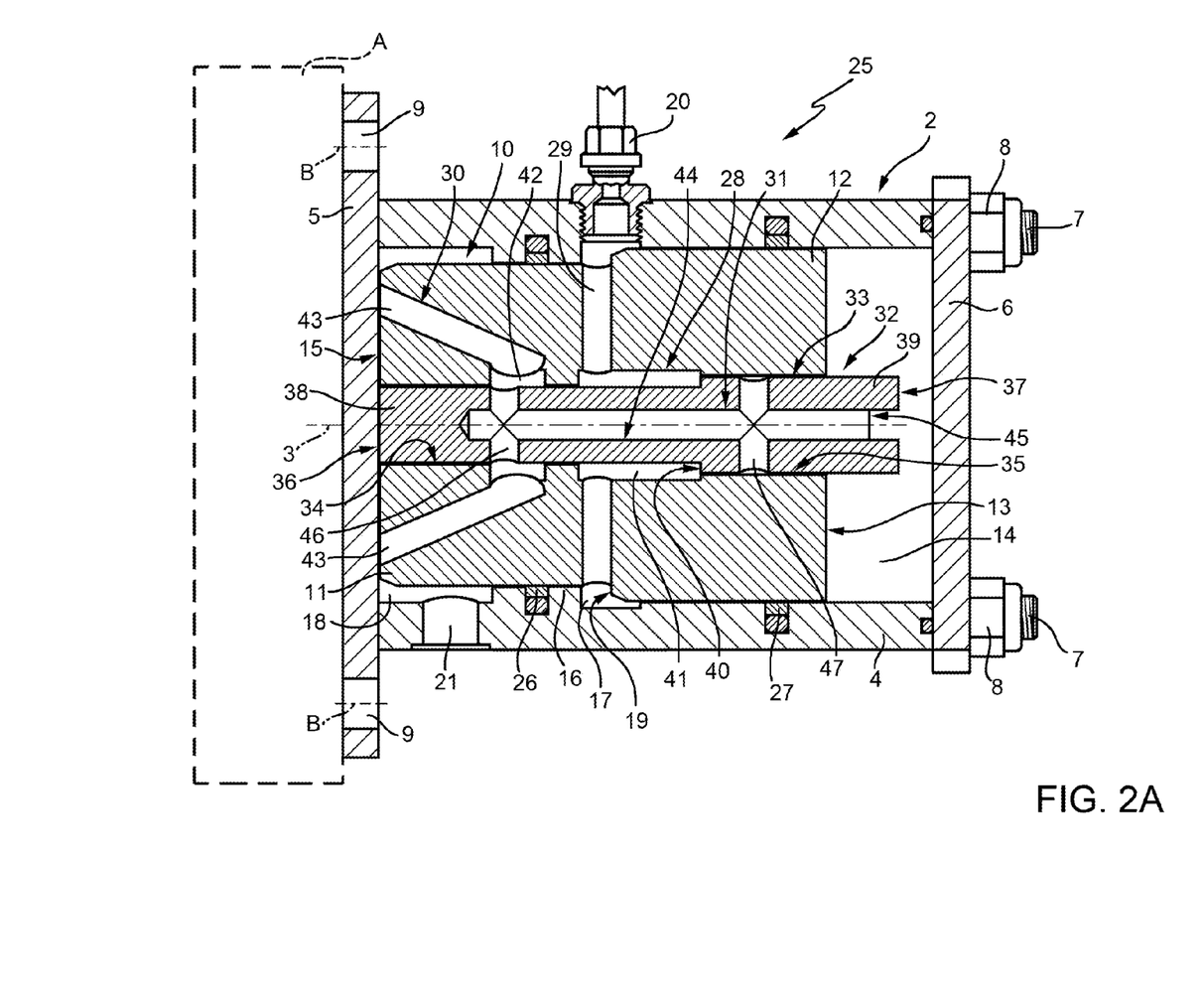
FIGS. 2A, 2B, 2C show axial longitudinal sections of a preferred embodiment of the vibrator according to the present invention in respective operating configurations.

To eliminate these drawbacks, a vibrator 25 is proposed, as shown in FIG. 2A, and the component parts of which are indicated, where possible, using the same reference numbers as for the corresponding parts of vibrator 1.

As shown in FIG. 2A, vibrator 25 is substantially identical to vibrator 1 as regards hollow body 2 and piston 10, the only difference being that, in vibrator 25, sliding, fluidtight sealing between piston 10 and the inner surface of lateral wall 4 is assured by a seal housed inside a groove in annular rib 16 and cooperating with portion 11 of piston 10, and by a further seal 27 housed inside a groove in lateral wall 4 and cooperating with portion 12 of piston 10.

Using seals 26 and 27, as opposed to no seals, as in vibrator 1, has the advantage of enabling the use of larger-diameter pistons 10.

Vibrator 25 also differs from vibrator 1 by comprising, instead of fluid circuit 22, a fluid circuit 28 comprising an inlet portion 29 similar to portion 23, but communicating at all times with annular chamber 17, regardless of the position of piston 10 along axis 3, and defined by a diametrical hole through piston 10; an outlet portion 30 communicating at all times with annular chamber 18 and outlet hole 21, regardless of the position of piston 10 along axis 3; and an intermediate switch portion 31 for connecting chamber 14 to inlet portion 29 and outlet portion 30 alternately.

Switch portion 31 is formed through a tracking switch unit, which is movable along axis 3 in the same direction as piston 10 and by the pressurized fluid operating piston 10; is designed, like piston 10, to contact both end walls 5 and 6; and, at each stroke of piston 10 (forward stroke to end wall 6, and return stroke to end wall 5), moves with respect to piston 10 to keep chamber 14 as long as possible in the start-of-stroke condition (connected to annular chamber 17 or annular chamber 18).

In the FIG. 2A embodiment, the tracking switch unit comprises an auxiliary piston 32 coaxial with axis and mounted to slide in fluidtight manner along an axial through hole 33 formed through piston 10 and communicating with the diametrical hole defining inlet portion 29 of fluid circuit 28.

Given the relatively small diameter of piston 32, the surface of hole 33 and the lateral surface of piston can be machined relatively cheaply for fluidtight sealing with no seals.

Hole 33 has two end portions 34, 35 along axis 3 and on opposite sides of inlet portion 29, and of which portion 35 is the larger in diameter and positioned facing end wall 6. Auxiliary piston 32 is preferably (though not necessarily) longer than piston 10 and shorter than the distance between end walls 5 and 6, is bounded by two end surfaces 36, 37 (of which surface 37 defines an active surface of auxiliary piston 32), and comprises two portions 38, 39, of which portion 39 is the larger in diameter, is bounded by end surface 37, engages portion 35 of hole 33 in fluidtight manner, and is connected to portion 38 by an annular shoulder 40 crosswise to axis 3.

Annular shoulder 40 defines another active surface of auxiliary piston 32, and is mounted to move inside an annular chamber 41, which is defined by auxiliary piston 32 at a wider intermediate portion of portion 35 of hole 33, and communicates at all times with inlet portion 29 of fluid circuit 28, regardless of the axial positions of pistons 10 and 32 with respect to each other and to lateral wall 4.

Portion 38 of auxiliary piston 32 engages portion 34 of hole 33 in fluidtight manner, and defines, with a wider intermediate portion of portion 34, an annular chamber 42 forming part of outlet portion 30. In addition to annular chamber 42, outlet portion 30 also comprises two oblique conduits 43, which communicate at one end with annular chamber 42, and terminate, at the other end, at respective points on end surface 15 of portion 11 of piston 10, to keep annular chamber 42 connected at all times to chamber 18, and therefore to outlet hole 21, regardless of the axial positions of pistons 10 and 32 with respect to each other and to lateral wall 4.

Switch portion 31 of fluid circuit 28 also comprises a dead axial hole 44, which is formed along auxiliary piston 32, coaxially with axis 3, from a diametrical recess 45 in end surface 37 of portion 39 of auxiliary piston 32, and extends through two diametrical holes 46, 47 formed through respective portions 38, 39 of auxiliary piston 32. Relative movement of auxiliary piston 32 with respect to piston 10 switches diametrical hole 46 between a closed position and a position connected to annular chamber 42, and switches diametrical hole 47 between a position connected to annular chamber 41, and a closed position. In other words, diametrical holes 46, 47 are so located as to connect alternately axial hole 44 to chamber 41 and chamber 42, and, in particular, to connect axial hole 44 solely to chamber 42, when both pistons 10 and 32 are in the cycle-start position contacting end wall 5, and to connect axial hole 44 solely to chamber 41, when both pistons 10 and 32 are in the end or end-of-forward-stroke position contacting end wall 6.

Operation of vibrator 25 will now be described, as of the FIG. 2A start position, in which both end surface 15 of portion 11 of piston 10, and surface 36 of portion 38 of auxiliary piston 32 are positioned contacting the inner surface of end wall 5.

In this position, diametrical hole 47 is closed, thus cutting off chamber 14 from annular chamber 17; and chamber 14 is connected to outlet hole 21 via axial hole 44 and diametrical hole 46 of switch portion 31, annular chamber 42 and conduits 43 of outlet portion 30, and annular chamber 18.

It is important to note that the above conditions are guaranteed by the start (FIG. 2A) configuration of fluid circuit 28 in the start position, and that the start configuration depends on the relative position of pistons 10 and 32.

When pressurized fluid is fed to annular chambers 17 and 41—which, as stated, communicate at all times with each other and with feed fitting 20, regardless of the positions of pistons 10 and 32 with respect to each other and to lateral wall 4—active surface 19 of annular chamber 17, and annular shoulder 40 are subjected to respective axial forces F1 and F3 in the direction of end wall 6, thus moving pistons 10 and 32 rapidly towards end wall 6.

Figure 2B:
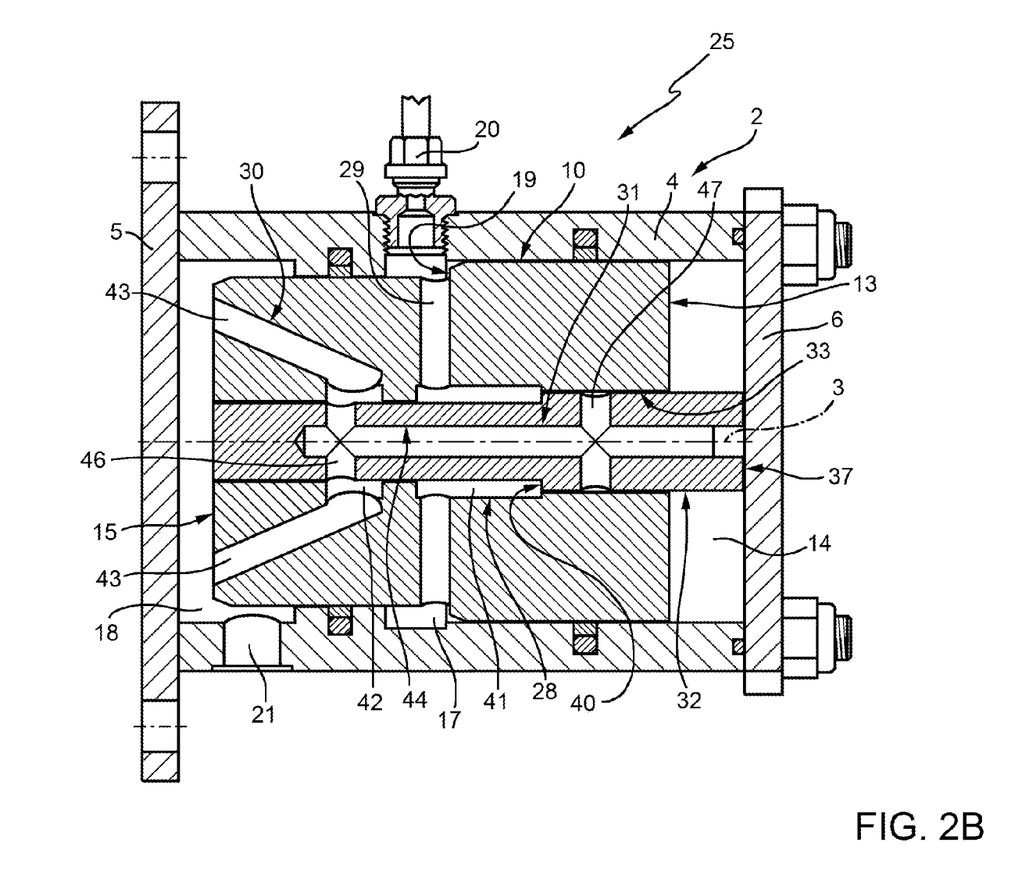

The concordant movements of pistons 10 and 32 towards end wall 6 need not necessarily follow the same law of motion. Whichever the case, however, the diameters and lengths of pistons 10 and 32 are conveniently designed so that piston 32 impacts end wall 6 before, or at most at the same time as, piston 10, and remains as long as possible in such a position with respect to piston 10 as to keep fluid circuit 28 (FIG. 2B) in the start configuration described; and so that, only at the very last moment, after auxiliary piston 32 impacts end wall 6, thus producing relative movement of piston 10 with respect to auxiliary piston 32, does fluid circuit 28 switch from the start configuration (FIG. 2A) to a new configuration (FIG. 2C), in which diametrical hole 46 is closed, thus cutting chamber 14 off from outlet hole 21, and diametrical hole 47 communicates with annular chamber 41, thus connecting chamber 14 to feed fitting 20. Because this switch only occurs at the very last moment, piston 10 continues moving by force of inertia until it impacts end wall 6.

Figure 2C:
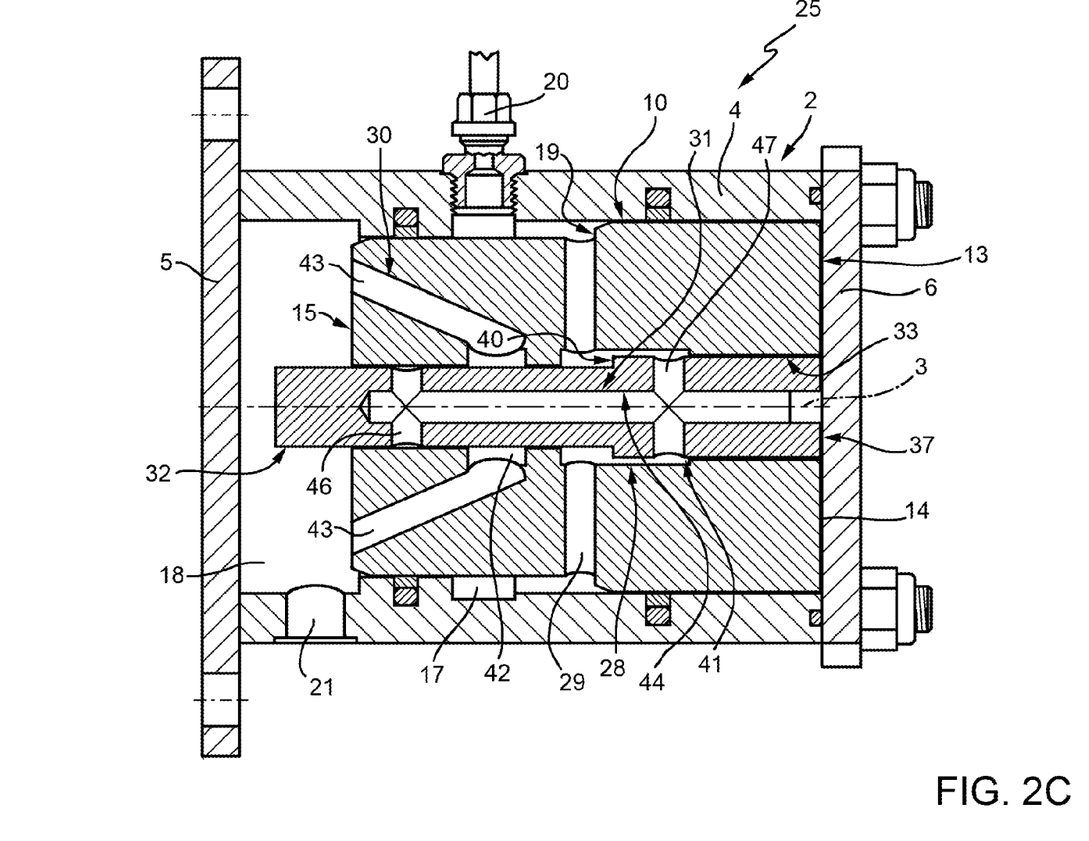

At this point, the pressurized fluid entering chamber 14 exerts respective forces F2 and F4 on pistons 10 and 32, in opposition to respective forces F1 and F3, which continue to act on pistons 10 and 32. But, because the end surface 13 of piston 10 is much larger than active surface 19, and the end surface 37 of auxiliary piston 32 is much larger than the surface of annular shoulder 40, forces F2 and F4 greatly exceed respective opposing forces F1 and F3, and so move pistons 10 and 32 in the same direction, and with a high degree of acceleration, towards end wall 5.

In this case, too, the concordant movement of pistons 10 and 32 allows fluid circuit 28 to remain in its new configuration (FIG. 2C) substantially throughout the travel of pistons 10 and 32 towards end wall 5, and to only switch back to its start configuration (FIG. 2A) when pistons 10 and 32 strike end wall 5.

In connection with the above, it is important to note that, unlike known vibrator 1, pistons 10 and 32 of vibrator 25 are able to make full use of the distance between end walls 5 and 6 during the return stroke to end wall 5. Because the acceleration produced by respective forces F2-F1 and F4-F3 on piston 10 and auxiliary piston 32 is constant, a longer stroke (than that of vibrator 1) produces a greater end speed; and because the energy dissipated upon impact, and therefore transmitted to body A for vibration, varies, as is known, with speed squared, the energy transmitted, for a given mass and size, by vibrator 25 is much greater than that of vibrator 1.

Another important point to note is that, whereas piston 10 of vibrator 1 practically fails to hit end wall 6, both pistons 10 and 32 of vibrator 25 hit end wall 6, and the energy produced, albeit small, is added to that produced on impacting end wall 5, thus further increasing the effectiveness of vibrator 25 as compared with vibrator 1.

Another important point to note is that, because the acceleration of pistons 10 and 32 is proportional, and therefore the length of the work cycle (forward and return strokes) inversely proportional, to feed pressure, impact rate can be adjusted proportionally by simply adjusting feed pressure.

Figure 3:
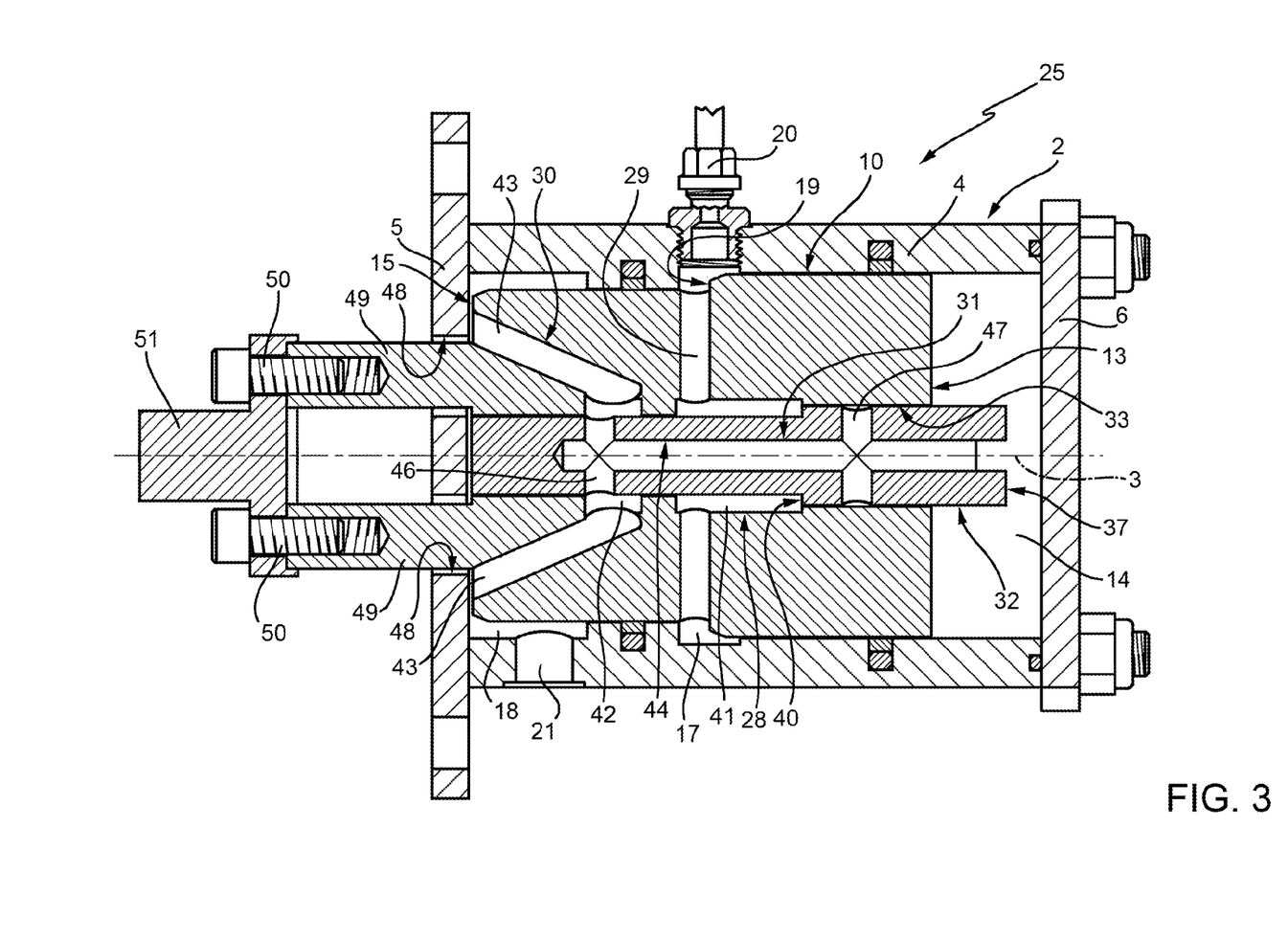
FIGS. 3 and 4 show axial longitudinal sections of respective further preferred embodiments of the vibrator according to the present invention.

In the FIG. 3 variation of vibrator 25, end wall of hollow body 2 has two axial through holes 48 located on opposite sides of axis 3 and engaged in sliding manner by respective axial appendixes 49 of portion 11 of piston 10; and a punch 51, located outside hollow body 2 and coaxial with axis 3, is fitted by axial screws 50 to the free ends of appendixes 49.

The FIG. 3 variation of vibrator 25 can be used as a hammer to deform and/or break up material.

Figure 4:
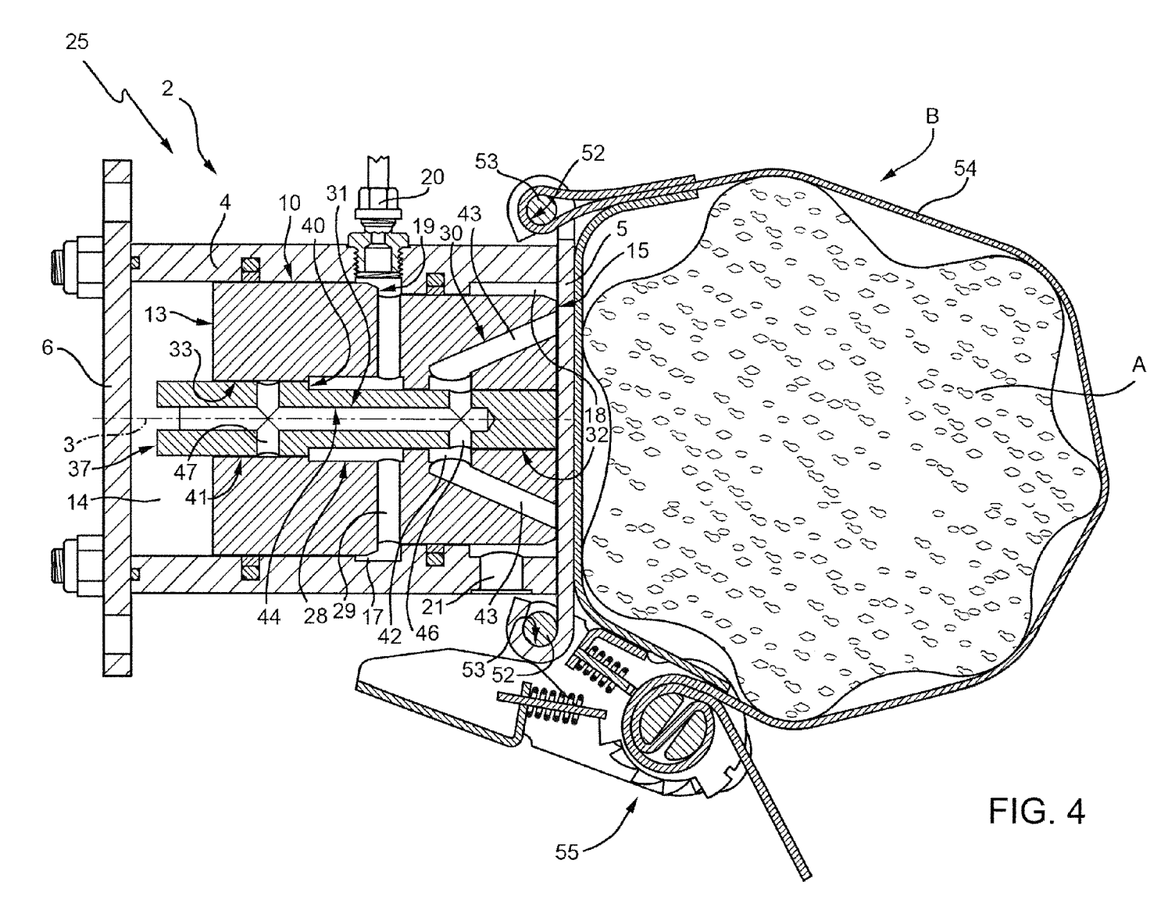

In the FIG. 4 variation of vibrator 25, the opposite ends of end wall 5 outside hollow body 2 are curled to define seats 52 for respective fastening pins 53, one of which is fitted with a belt 54, and the other with a known jack tensioner 55 for tightening belt 54 about a body A for vibration, such as a tree trunk, and tightening end wall 5 firmly to body A.

The FIG. 4 variation of vibrator 25 may be used in agriculture to shake olives or other hanging fruit off tress.

Figure 5:
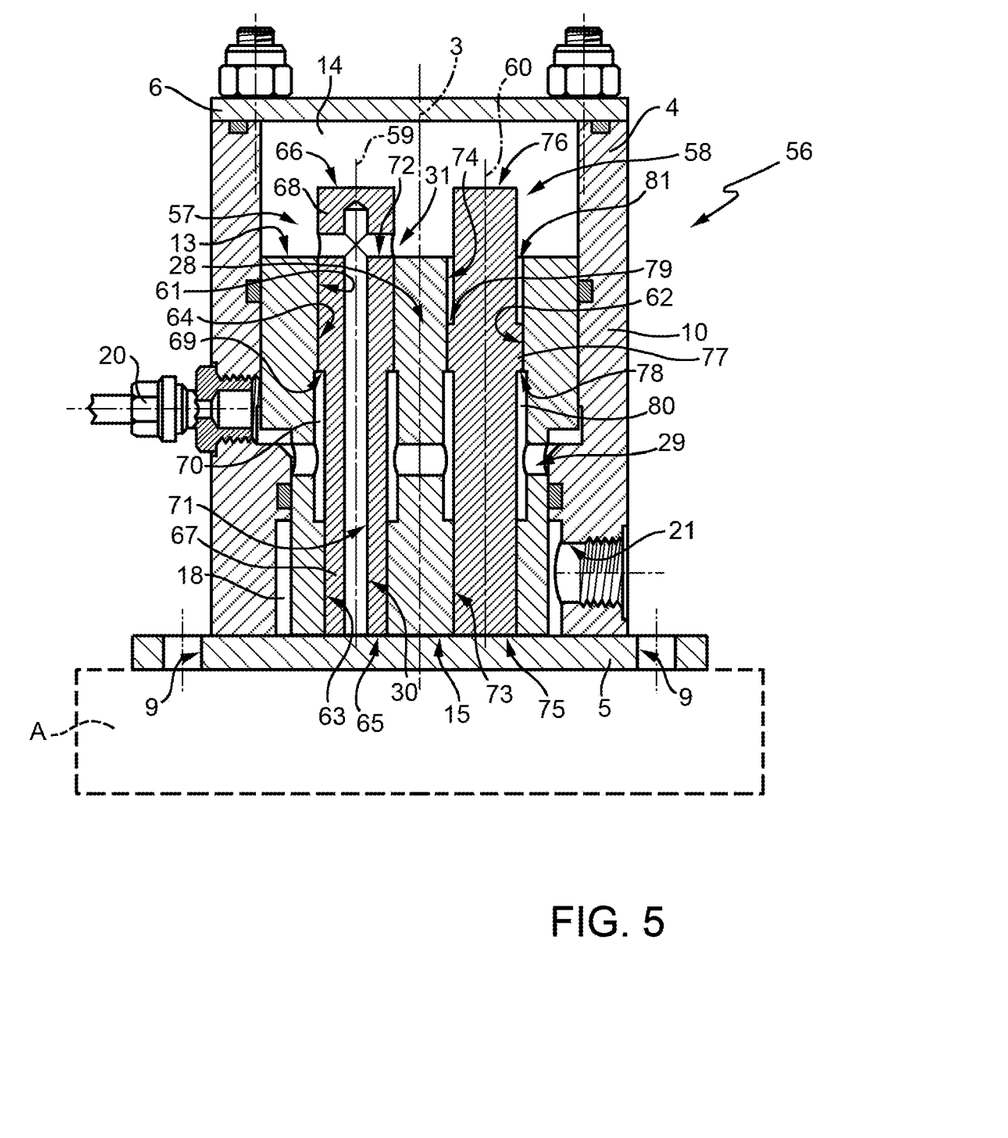
FIG. 5 shows an axial longitudinal section of a variation of the FIGS. 2A, 2B, 2C embodiment.

The vibrator indicated as a whole by 56 in FIG. 5 is a variation of the FIG. 2 vibrator 25, may be modified as shown in the FIGS. 3 and 4 variations, and its component parts are indicated where possible using the same reference numbers as for the corresponding parts of vibrator 25.

Vibrator 56 comprises a hollow body 2 and piston 10 substantially identical to those of vibrator 25, and, like vibrator 25, has a fluid circuit 28 comprising an inlet portion 29 defined by a diametrical hole through piston 10, and which communicates at all times with annular chamber 17, regardless of the position of piston along axis 3; an outlet portion 30, which communicates at all times with annular chamber 18 and outlet hole 21, regardless of the position of piston 10 along axis 3; and an intermediate switch portion 31 for connecting alternately chamber 14 to inlet portion 29 and outlet portion 30.

Switch portion 31 is formed through a tracking switch unit, which is movable along axis 3 in the same direction as piston 10 and by the pressurized fluid operating piston 10; is designed, like piston 10, to contact both end walls 5 and 6; and, at each stroke of piston 10 (forward stroke to end wall 6, and return stroke to end wall 5), moves with respect to piston 10 to keep chamber 14 as long as possible in the start-of-stroke condition (connected to annular chamber 17 or annular chamber 18).

In the FIG. 5 embodiment, the tracking switch unit is defined by two auxiliary pistons 57, 58, of which piston 57 is an auxiliary tracking outlet piston, and piston 58 an auxiliary tracking feed piston. In other words, in the FIG. 5 tracking switch unit, the lags in switching connection of chamber 14 to outlet hole 21 and feed fitting 20 are determined by two specific auxiliary pistons, as opposed to one piston, as in the FIG. 2 embodiment.

Auxiliary pistons 57, 58 have respective axes 59, 60 parallel to each other and to axis 3, are located on opposite sides of axis 3, and are mounted to slide in fluidtight manner along respective axial through holes 61, 62 formed through piston 10 and communicating with the diametrical hole defining inlet portion 29 of fluid circuit 28.

In this case, too, given the relatively small diameter of pistons 57, 58, the surfaces of holes 61, 62, and the lateral surfaces of pistons 57, 58 can be machined relatively cheaply to achieve fluidtight sealing without using seals.

Hole 61 has two end portions 63, 64 located along axis 59, on opposite sides of inlet portion 29, and of which the larger-diameter portion 64 is positioned facing end wall 6. Auxiliary piston 57 is preferably (though not necessarily) longer than piston 10 and shorter than the distance between end walls 5 and 6, is bounded by two end surfaces 65, 66 (of which surface 66 is an active surface of auxiliary piston 57), and comprises two portions 67, 68, of which the larger-diameter portion 68 is bounded by end surface 66, engages portion 64 of hole 61 in fluidtight manner, and is connected to portion 67 by an annular shoulder 69 crosswise to axis 59.

Annular shoulder 69 defines a further active surface of auxiliary piston 57, and is mounted to move, in use, inside an annular chamber 70, which is defined by auxiliary piston 57 at a wider intermediate portion of portion 64 of hole 61, and communicates at all times with inlet portion 29 of fluid circuit 28, regardless of the axial positions of pistons 10, 57, 58 with respect to one another and to lateral wall 4.

Portion 67 of auxiliary piston 57 engages portion 63 of hole 61 in fluidtight manner.

Outlet portion 30 of fluid circuit 28 is defined by a dead axial hole 71 formed along auxiliary piston 57 from end surface 65, and therefore communicating at all times with chamber 18 and outlet hole 21, regardless of the axial positions of pistons 10, 57, 58 with respect to one another and to lateral wall 4. Close to end surface 66, a diametrical through hole 72 extends diametrically through piston 57, and forms part of switch portion 31, in particular the part designed to delay disconnection of chamber 14 and outlet hole 21 as long as possible. Diametrical hole 72 communicates with axial hole 71, and connects axial hole 71 to chamber 14 when auxiliary piston 57 and piston 10 are positioned contacting end wall 6, in the start configuration shown in FIG. 5.

Hole 62 comprises two end portions 73, 74 located along axis 60, on opposite sides of inlet portion 29, and of which the larger-diameter portion 74 is positioned facing end wall 6. Auxiliary piston 58 is generally the same length as auxiliary piston 57, is bounded by two end surface 75, 76, with surface 76 facing end wall 6, and is in the form of a constant-diameter cylindrical rod, which engages portion 73 of hole 62 in fluidtight manner, and comprises an intermediate cylindrical collar 77 connected to the outer surface of piston 58 by an annular shoulder 78 facing end wall 5, and by an annular shoulder 79, whose surface facing end wall 6 defines, with surface 76, an active surface of auxiliary piston 58.

Annular shoulder 78 defines a further active surface of auxiliary piston 58, and is mounted to move, in use, inside an annular chamber 80, which is defined by auxiliary piston 58 at a wider inner end portion of portion 74 of hole 62, and communicates at all times with inlet portion 29 of fluid circuit 28, regardless of the axial positions of pistons 10, 57, 58 with respect to one another and to lateral wall 4, Cylindrical collar 77 is axially shorter than chamber 80 and the relative movement, in use, of auxiliary piston 58 with respect to piston 10; and annular shoulder 79 is located at the end of annular chamber 80 facing end wall 6 when surfaces 75 and 15 are coplanar. Collar 77 therefore defines, inside hole 62, a variable-length annular conduit 81, which forms the part of switch portion 31 designed to delay connection of chamber 14 and inlet portion 29 as long as possible, and which only connects chamber 14 and inlet portion 29 when the whole length of collar 77 is inserted inside annular chamber 80 by auxiliary piston 58 sliding axially with respect to piston 10.

In actual use, when pressurized fluid is fed to inlet portion 29 of fluid circuit 28 of vibrator 56 in the FIG. 5 start position, it floods annular chambers 70 and 80, and acts on active surface 19 of piston 10 and annular shoulders 69 and 78 to move pistons 10, 57 and 58 rapidly towards wall 6. During this movement, chamber 14 communicates at all times with outlet hole 21 via diametrical hole 72 and axial hole 71 in auxiliary piston 57; and pressurized-fluid supply to chamber 14 via hole 62 is prevented by cylindrical collar 77 engaging end portion 74 in fluidtight manner.

Connection of chamber 14 to outlet hole 21 is only cut off when auxiliary piston 57 hits end wall 6 and moves with respect to piston 10 to close diametrical hole 72. At which point, piston 10 continues moving by force of inertia until it hits wall 6.

The above movement of auxiliary piston 57 with respect to piston 10 is accompanied by a similar movement of auxiliary piston 58 with respect to piston 10, and which moves collar 77 into annular chamber 80, thus connecting chamber 14 to inlet portion 29 of fluid circuit 28 and so moving pistons 10, 57 and 58 rapidly towards end wall 5.

The invention claimed is:

1. A vibrator comprising:
    a hollow body having a longitudinal axis, and a first and second end wall crosswise to the longitudinal axis;
    an inlet and outlet for pressurized fluid;
    a piston housed in sliding and fluidtight manner inside the hollow body to perform, in use, a succession of operating cycles, each comprising a forward stroke and a return stroke along the longitudinal axis and between the first and second end wall, the piston defining, inside the hollow body, a first chamber communicating with the inlet and bounded by a first active surface of the piston, and a second chamber bounded by a second active surface of the piston, larger than and opposite the first active surface;
    a fluid circuit for the pressurized fluid, the fluid circuit connecting the second chamber to the first chamber and to the outlet alternately as a function of the axial position of the piston; and
    a tracking switch unit freely movable between the first and second end wall by said pressurized fluid along the longitudinal axis and in the same direction as and with respect to the piston;
    the fluid circuit comprising an inlet portion formed in the piston and communicating at all times with the first chamber; an outlet portion formed in the piston and communicating at all times with the outlet; and a switch portion, which is formed in the tracking switch unit, communicates at all times with the second chamber, and connects the second chamber to the inlet portion and to the outlet portion alternately as a function of the axial position of the tracking switch unit with respect to the piston.

2. A vibrator as claimed in claim 1, wherein the switch portion comprises a dead first hole parallel to the longitudinal axis and communicating at all times with the second chamber; and a second and third hole, which are crosswise to the longitudinal axis, extend through the first hole, and are movable, with and as the tracking switch unit moves axially with respect to the piston, between respective closed and open positions.

3. A vibrator as claimed in claim 2, wherein the second and third hole are so located along the first hole that, when one of the second and third hole is in its closed position, the other is in its open position.

4. A vibrator as claimed in claim 1, wherein the piston comprises a seat parallel to the longitudinal axis and communicating with the second chamber, the inlet portion, and the outlet portion; the tracking switch unit comprising an auxiliary piston mounted to slide in fluidtight manner along the seat; and the switch portion being formed along the auxiliary piston.

5. A vibrator as claimed in claim 4, wherein the seat comprises a first wider portion; and the auxiliary piston defines, with said first wider portion, a third chamber forming part of the inlet portion and bounded by a third active surface; the auxiliary piston being bounded, on the end facing the second chamber, by a fourth active surface larger than the third; and the third and fourth active surfaces being opposite each other and crosswise to the longitudinal axis.

6. A vibrator as claimed in claim 5, wherein the seat comprises a second wider portion; and the auxiliary piston defines, with said second wider portion, a fourth chamber forming part of the outlet portion.

7. A vibrator as claimed in claim 4, wherein said seat is a through hole formed through the piston; and the auxiliary piston is mounted to slide in fluidtight manner along the through hole and into contact with the first and second end wall alternately.

8. A vibrator as claimed in claim 4, wherein the auxiliary piston, measured along the longitudinal axis, is longer than the piston and shorter than the distance between the first and second end wall.

9. A vibrator as claimed in claim 1, and comprising fastening means for securing the hollow body rigidly and directly onto a body for vibration.

10. A vibrator as claimed in claim 9, wherein the fastening means comprise a belt, which loops about said body for vibration; and tensioning means for tightening the belt about the body for vibration.

11. A vibrator as claimed in claim 9, and comprising a punch; the piston comprising an end portion extending axially through said first or second end wall; and the punch being connected rigidly to said end portion, outside the hollow body.

12. A vibrator as claimed in claim 1, wherein the tracking switch unit is defined by two auxiliary pistons, of which one is a tracking auxiliary piston for connection of the second chamber to the outlet, and the other is a tracking feed piston for connection of the second chamber to the inlet.

\* \* \* \* \*